UNITED STATES PATENT OFFICE.

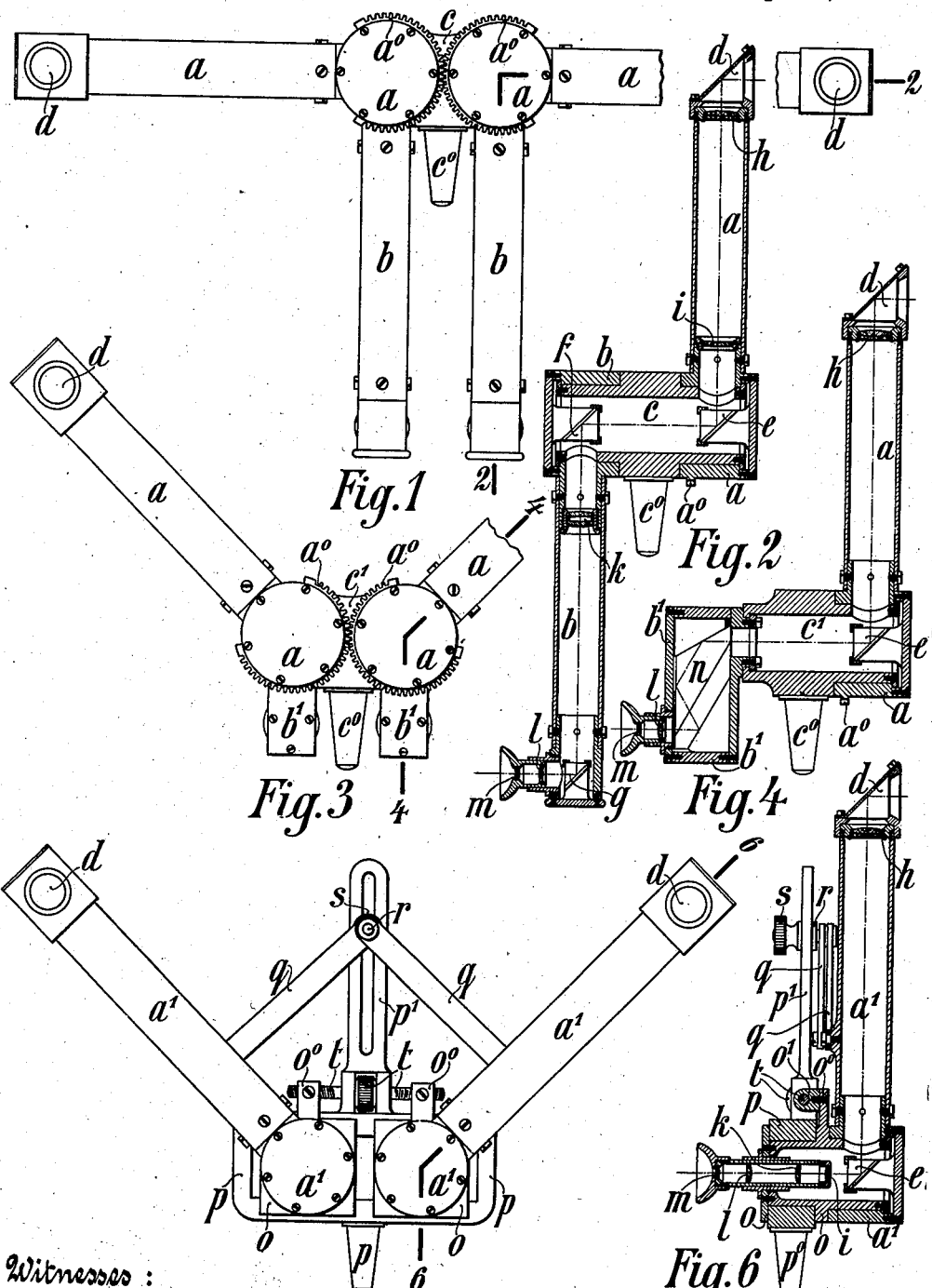

ALBERT KÖNIG, OF JENA, GERMANY, ASSIGNOR TO THE FIRM OF CARL ZEISS, OF JENA, GERMANY.

DOUBLE TELESCOPE.

No. 918,752.  Specification of Letters Patent.  Patented April 20, 1909.

Application filed March 19, 1908. Serial No. 422,123.

*To all whom it may concern:*

Be it known that I, ALBERT KÖNIG, a citizen of the German Empire, and residing at Carl-Zeiss strasse, Jena, in the Grand Duchy of Saxe-Weimar, Germany, have invented a new and useful Double Telescope, of which the following is a specification.

The invention consists in an improvement in double telescopes having elevated entrance pupils, that is to say, having a difference in height between the entrance and the exit pupils, such difference permitting observations being made over some obstacle while the observer is under cover of it. Double telescopes of this kind have hitherto been manufactured as hinged telescopes, that is, with a hinge joint between the two single telescopes. As is well known, in such hinged telescopes the distance between the exit pupils is adapted to the inter-pupilary distance of the observer by altering the angle included by the single telescopes a little. This adjustment to the inter-pupilary distance alters at the same time the distance between the entrance pupils, upon which distance the degree of the stereoscopic effect is dependent, and likewise alters—though in a contrary sense—the elevation of the entrance pupils above the exit pupils and thereby the measure of the useful height of the cover with given height of the eyes. Both latter alterations are insignificant and only occur when the instrument is handed over to another observer having other inter-pupilary distance. It would be, however, advantageous, if every observer could use the instrument with large distance between the entrance pupils, where the cover is low, and be compelled to content himself with a small amount of this distance only, where the instrument has to be adapted to a high cover.

The present invention fulfils the requirement just mentioned. Its object is a double telescope, each of the two objective casings of which is rotatable about a section of the optical axis parallel to the section of entrance of the respective single telescope, whereby both objective casings can be coupled to produce an equally large but opposite motion. This motion evidently does not alter the position of the sections of exit of the two optical axes, consequently the distance between the exit pupils remains unchanged.

For adapting the distance between the exit pupils to the inter-pupilary distance any one of the known means suited to this purpose may be employed. In general in this adaptation also an alteration of the relative position of the entrance pupils is involved, which is, however, slight, and which by virtue of the rotatability of the objective casings can be again nullified. In the special case where the means of adaptation consists in the rotation of one or both ocular casings about a section of the optical axis parallel to the section of entrance, the relative position of the entrance pupils remains unaltered. This means permits of realizing a particularly simple form of instrument. Each of the two optical axes may be so shaped, that it only contains one middle section which is parallel to the axis of entrance. This middle section then becomes the common axis of rotation for the objective casing and the ocular casing. Even such means for adapting the distance between the exit pupils to the inter-pupillary distance, which somewhat influences the relative position of the entrance pupils, does not exclude a relatively simple form of the instrument being realized. An arrangement, for example, for each single telescope is to be recommended, in which no middle section whatever of the optical axis is parallel to the section of entrance. The section of exit then becomes the axis of rotation of the objective casing or the complete single telescope may be made rotatable about it. In the simplest form the optical axis is composed of three sections, there are therefore only two reflecting prisms necessary.

In the annexed drawing: Figure 1 is a back view of a double telescope constructed according to the invention, the objective casings being rotated into a horizontal position. Fig. 2 is a sectional side view of the same instrument, the objective casings being rotated into a vertical position. Fig. 3 is a back view of another double telescope constructed according to the invention, the objective casings being rotated into an upward position at right angles to each other. Fig. 4 is a sectional side view of the same instrument, the objective casings being rotated into a vertical position. Fig. 5 is a back view of a third double telescope constructed according to the invention, the objective casings being rotated into an upward position at right angles to each other. Fig. 6 is a sectional side view of the same instrument, the objective casings being rotated into a vertical position.

The example in Figs. 1 and 2 discloses a form of the invention in which either optical axis comprises only one middle section which is parallel to the section of entrance and about which not only the objective casing $a$, but also the ocular casing $b$ is rotatable. The main casing $c$ of the double telescope may be made rotatable on a stand about a vertical axis, as is indicated by its downwardly directed conical pivot $c^0$. The two objective casings $a$ are coupled by toothed sectional wheels $a^0$, whose circumference is so great, that they remain engaged, if the objective casings be turned into the direction of the ocular casings for transport purposes. In this example it is further assumed, that a sufficient hinge friction is provided for the objective casings, in order to be able to dispense with a device for checking these casings in any position. The ocular casings $b$ are only to such an extent rotatable as corresponds to the range of inter-pupilary distances. One of them may be rigidly connected with the main casing $c$. The optical system of either single telescope comprises, besides the two pairs of prisms $d\ e$ and $f\ g$, an objective $h$, a collective lens $i$ placed in or near the image plane of this objective, an inverting lens system $k$, whose image plane may be situated in the hinder surface of the prism $g$, and the two lenses $l$ and $m$ of a Ramsden ocular.

In the example according to Figs. 3 and 4, the middle lenses $i$ and $k$ and the pair of prisms $f\ g$, both shown in the first example, are substituted by the image-erecting prism $n$, by which means the ocular casings $b$ are shortened into $b^1$ and the main casing $c$ is modified into $c^1$. The image plane of the objective $h$ may coincide with the hinder face of the prism $n$.

The example Figs. 5 and 6 presents greater deviations from the first one. Each telescope casing consists of only just the objective casing $a^1$ and the ocular casing $o$. Each objective casing is rotatable about its ocular axis and again coupled with the other to equal but opposite motions. For this purpose on the carrier $p$ of the single telescopes, which is equipped with the pivot $p^0$, a slotted standard $p^1$ is arranged. Two links $q$ are on the one side connected with the objective casings and on the other with a sliding piece $r$, which is guided in the slot of the standard $p^1$ and can be secured in any place of this slot, corresponding to any position of the objective casing $a^1$, by means of a checking screw $s$. The adjustability of the distance between the oculars is attained by the ocular casings $o$ being guided in the carrier $p$ and their projections $o^0$ being fixed to the nuts $o^1$, so that the set-screw $t$ placed in the standard $p^1$ and provided with right and left screw threads may serve to move the oculars by equal but opposite lengths. The optical outfit of the objective casings $a^1$ is the same as that of the preceding example. The image plane of the objective lies, however, near the hinder surface of the prism $e$. The ocular casings $o$ contain the lens system $i\ k\ l\ m$, from the first example, combined to form an image-erecting ocular. Instead of forming the ocular casings $o$ as sliding pieces, they can be also firmly connected with the objective casings $a^1$ and placed in special sliding pieces, so that either single telescope is turned as a whole about its ocular axis. In both cases, for adjusting the distance between the oculars, instead of the device described for moving the ocular casings in a straight line such an one for turning these casings about a common hinge axis can be chosen.

I claim:

1. A double telescope each of whose single telescopes is provided with an optical system, the axis of which is broken and comprises parallel sections including the entrance section, and an objective casing rotatably mounted about a section parallel to the entrance section.

2. A double telescope each of whose single telescopes is provided with an optical system, the axis of which is broken and comprises a section intermediate the objective and the ocular and parallel to the entrance section, and an objective casing rotatably mounted about said intermediate section, at least one of the single telescopes having an ocular casing likewise rotatably mounted about the said intermediate section.

ALBERT KÖNIG.

Witnesses:
PAUL KRÜGER,
FRITZ LANDER.